(No Model.)

W. G. LEWI.
SWITCH.

No. 557,404. Patented Mar. 31, 1896.

WITNESSES:
Edward Thorpe
Fred Acker

INVENTOR
W. G. Lewi
BY
Munn & Co
ATTORNEYS.

UNITED STATES PATENT OFFICE.

WILLIAM G. LEWI, OF ALBANY, NEW YORK.

SWITCH.

SPECIFICATION forming part of Letters Patent No. 557,404, dated March 31, 1896.

Application filed April 20, 1895. Serial No. 546,493. (No model.)

*To all whom it may concern:*

Be it known that I, WILLIAM G. LEWI, of Albany, in the county of Albany and State of New York, have invented a new and Improved Switch, of which the following is a full, clear, and exact description.

My invention relates to an improvement in switches, and especially to an improvement in devices for shifting the same; and the object of the invention is to provide a shifting device for switches capable of being operated from a moving car, which will be exceedingly simple, durable, and economic in its construction, and which will comprise but few parts, none being liable to disarrangement.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
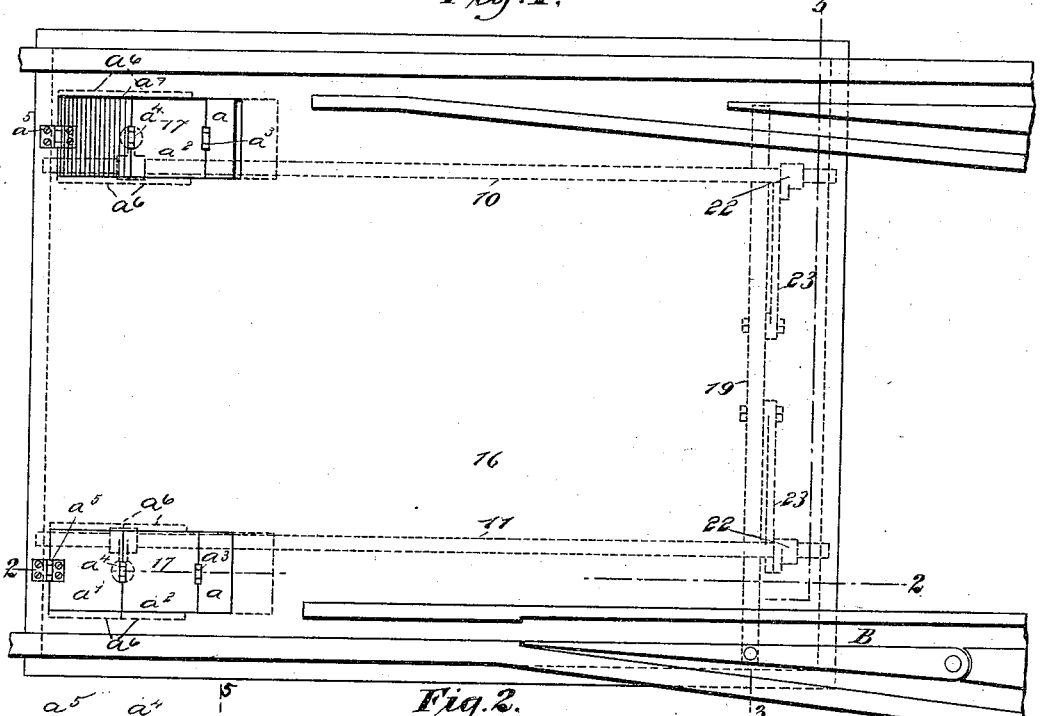
Figure 2:
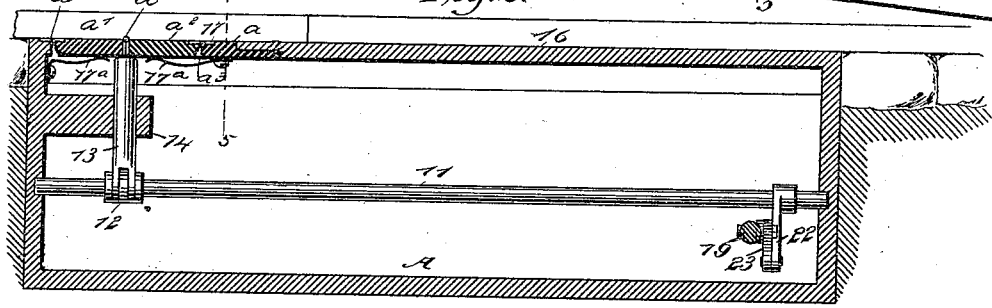
Figure 3:
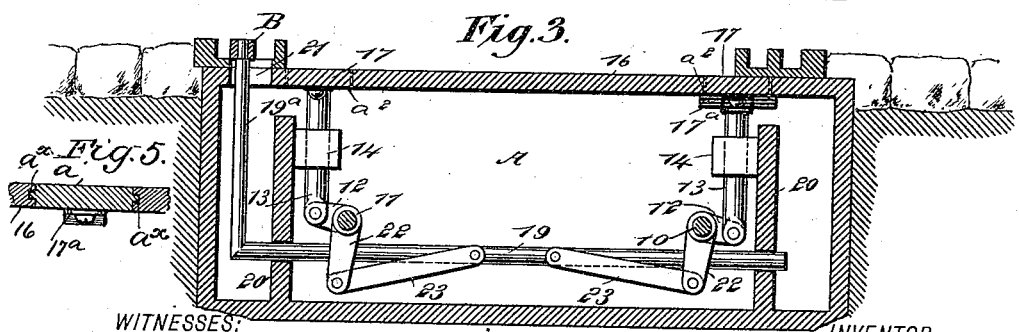
Figure 4:
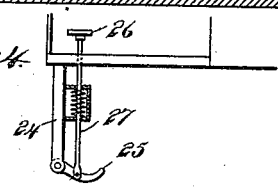

Figure 1 is a perspective view of a portion of a track and a switch, illustrating the application of the improved mechanism thereto. Fig. 2 is a vertical section taken longitudinally through the switch-operating mechanism on the line 2 2 of Fig. 1. Fig. 3 is a transverse section taken substantially on the line 3 3 of Fig. 1. Fig. 4 is a view of a device which may be used in connection with a car to depress the shifting plates or platforms. Fig. 5 is a fragmentary sectional view taken through one of the shifting plates substantially in the plane indicated by the line 5 5 in Fig. 2.

In carrying out the invention a pit A is formed beneath a movable switch-point B, and the said pit is made to extend some distance beyond the free end of the said switch-point, as shown in dotted lines in Fig. 1. Longitudinally within the pit A, at each side thereof, a rock-shaft is journaled, the said rock-shafts being designated, respectively, as 10 and 11. Each rock-shaft, at the end farthest removed from the switch-point, is provided with a crank-arm 12, and each crank-arm is pivotally attached to a plunger 13, having sliding movement in a guide-block 14, horizontally projected from the wall of the pit, as shown in Figs. 2 and 3, and immediately above each plunger an opening is made in the plate 16 or other cover placed over the pit, and each of the said openings is normally closed by a shifting plate 17.

The shifting plates are of like construction, each being made up of a number of sections, and they are constructed as follows: The sections of the plate are preferably three in number, including the section $a$ facing the switch-point, which is held to slide in ways produced at opposite sides of that end of the opening, as indicated at $a^\times$ in Fig. 5, which is a sectional view taken through said plate. A second section $a'$ is connected with the first or sliding section $a$ by an intermediate section $a^2$, and a hinge $a^3$ connects the sliding section with the intermediate section of the platform, the hinge being such that the section $a^2$ may be dropped downward, and the intermediate section $a^2$ is connected by a hinge $a^4$ with the section $a'$, the hinge permitting the two sections to separate when they are pressed downward, and the section $a'$ is connected with a wall of the pit A or an equivalent support by means of a hinge $a^5$, which will permit the two sections $a'$ and $a^2$ to drop in a downwardly direction when tension is exerted in the same direction upon their upper faces, and, as shown in dotted lines at $a^6$ in Fig. 1 and in full lines in Fig. 3, the sections $a'$ and $a^2$ of the platform are provided with flanges entering recesses in the under side of the cover-plate 16 of the pit at each side of the opening in which the platform is placed. Said flanges $a^6$ serve to prevent the sections $a'$ $a^2$ from being elevated by their springs 17ᵃ above the upper side of said cover-plate 16.

Springs 17ᵃ or their equivalents are secured one to the bottom of the sliding section $a$, and the spring has bearing on the under face of the section $a^2$, the second spring being secured to a fixed support and having bearing against the under face of the section $a'$. These springs normally hold the platform horizontal, and the plungers 13 engage with the bottom of these platforms, preferably just below where the sections $a'$ and $a^2$ are connected, as illustrated in Fig. 2. Thus it will be observed that when a plunger attached to a car is forced downward to an engagement with the platform it will cause the platform to bow inward and downward, the sliding section *a* permitting such movement, and that the plunger of the car will ride readily over the platform and will operate the same conveniently, preventing all possibility of jarring the mechanism communicating with the plunger and with the switch-point.

A shifting-bar 19 is held to slide in suitable uprights or posts 20, located in the pit, as shown in Fig. 3, and the said shifting-bar is provided with an extension 19ª from one of its ends, extending up through an opening 21 in the cover-plate to an engagement with the switch-point, and it will be observed that by operating the shifting-bar 19 endwise the switch-point may be moved inward or outward, as found necessary. The operation of the shifting-bar is automatically accomplished by pressing downward upon either of the shifting plates 17, and thereby operating either the rock-shaft 10 or 11 by compressing the plunger connected therewith. This automatic shifting is accomplished by securing to each of the rock-shafts 10 and 11, at their ends nearest the switch, a crank-arm 22, which extends downward from the rock-shaft and at its free end is pivotally connected with a link 23, the links of the two rock-shafts being pivotally attached to the shifting-bar, one at each side of its center, as shown in Fig. 3.

In Fig. 4 I have illustrated a device whereby the shifting platforms or plates may be depressed from the platform of a moving car; but I do not limit myself to any form of device for this purpose.

The construction shown in Fig. 4 consists of a pedestal 24, which is projected downward from the platform and carries at its lower end a pivoted shoe 25, having an upward curve, and this shoe is lowered by pressing with the foot upon the head 26 of a spring-controlled rod 27, pivotally connected with the shoe.

Having thus described my invention, I claim as new and desire to secure by Letters Patent—

1. The combination, with a switch and depressible platforms located in front of the switch, of parallel rock-shafts, a plunger located beneath each platform, the said platform comprising two drop-sections and a sliding section, all of which have a hinged connection, a crank connection between each plunger and a rock-shaft, a shifting-bar having end movement and connected with the movable section of the switch, a crank-arm projected downward from each rock-shaft, and a link pivoted to each of the crank-arms, the said links being carried in direction of each other and pivotally attached to the said shifting-bar at each side of its center, as and for the purpose specified.

2. In a switch device, the combination of a cover-plate having an opening, a depressible platform adapted to close said opening and means for preventing said platform from rising above the level of said cover-plate, substantially as set forth.

3. In a switch device, the combination of a cover-plate having an opening, a depressible platform adapted to close said opening and consisting of two sections loosely connected together, and means for holding said sections normally flush with the cover-plate, substantially as set forth.

4. In a switch device, the combination of a cover-plate having an opening, a depressible platform adapted when raised to close said opening, said platform consisting of three sections loosely connected together, and having one of its end sections loosely connected to one end of the opening in the cover-plate and its other end section mounted to slide on the cover-plate, substantially as set forth.

5. In a switch device, the combination of a cover-plate, having an opening, a depressible platform comprising two sections adapted to close said opening in the cover-plate and provided with flanges adapted when the platform is in its raised position to engage the under side of the cover-plate, and a spring for holding said platform normally in a raised position, substantially as set forth.

6. In a switch device, the combination of a cover-plate having an opening, a depressible platform arranged to cover the said opening and comprising three sections hinged together, the section at one end of said platform being hinged to the cover-plate at one end of the said opening, and the section at the opposite end of the said platform being arranged to slide on the cover-plate at the opposite end of the said opening, substantially as shown and described.

WILLIAM G. LEWI.

Witnesses:
JULIUS ILLCH,
JAMES A. ROBINSON.